Sept. 8, 1931.    H. L. RICHARDSON    1,822,422
WINDING DRUM
Filed Sept. 5, 1929
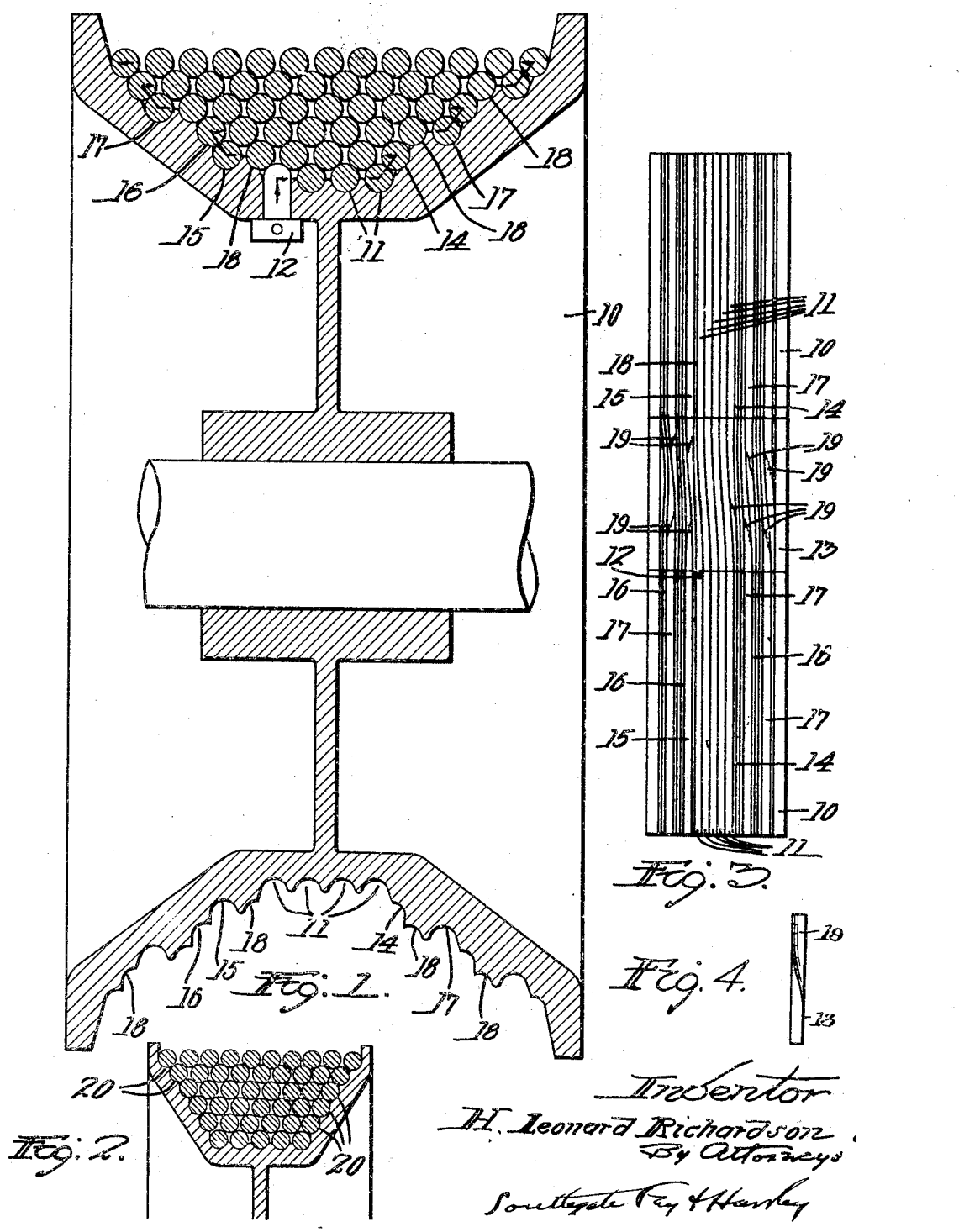

Patented Sept. 8, 1931

1,822,422

UNITED STATES PATENT OFFICE

HERBERT LEONARD RICHARDSON, OF WORCESTER, MASSACHUSETTS

WINDING DRUM

Application filed September 5, 1929. Serial No. 390,599.

This invention relates to a winding drum for elevators, hoisting machines, and other purposes.

The principal objects of the invention are to provide means for positively receiving and guiding the rope or cable at each end of each layer on the drum so as to locate the first strand of each layer properly and avoid the difficulty of its crowding down between the last strand in any layer and the side wall of the drum, thus materially wearing the cable and reducing its durability; to provide an improved and comparatively inexpensive way of switching the strands from one groove to the next in the same layer, without forming a helical groove, and to provide means whereby the cable can be wound in a comparatively large number of layers on the drum, thus shortening the drum materially without reducing the life of the cable.

Other objects and advantages of the invention will appear hereinafter.

Reference is to be had to the accompanying drawings, in which

Fig. 1 is a diametrical sectional view of a winding drum constructed in accordance with this inventon;

Fig. 2 is a similar fragmentary view showing another form of the invention;

Fig. 3 is a development of the circumference of the drum, showing the means for guiding a strand and switching over from one groove to the next, and Fig. 4 is a face view of an insert constituting an element of the device.

It is customary on winding drums to wind the cable in one layer, if possible, so as to avoid the winding of one layer of cable on another. It has sometimes been necessary to wind the cables in two layers, and whenever that has been done there has been trouble owing to the fact that the first strand of the second layer has a tendency to bind between the end wall of the drum and the next strand, resulting in a great amount of wear and sometimes in difficulty in getting the cable to unwind properly. The drums have usually been provided with a helical groove, which adds to the expense of manufacture.

In accordance with this invention, the drum 10, as shown in Figs. 1 and 3, has a cylindrical central shape, thus doing away with vertical end walls. The central portion is provided with a number of bottom grooves 11 for the first layer, and the end of the cable is secured in the first groove by a fastening device 12 of any desired character.

The grooves 11 are shown as parallel except at a cross-over insert 13 provided therein to transfer from one groove to the next. The cross-over insert is a separate plate set in with curved grooves to switch the cable from one groove 11 to the next one. It extends all the way across the drum and contains the switches for all the grooves. The drum is turned with parallel grooves and then a segment taken out and this cross-over put in. The cable winds naturally along the straight grooves 11 at the bottom of the drum and through the grooves 19 from one side to the other. When the cable reaches the last groove, in order to wind it back in another layer just above the first one, I have provided a groove 14 in the conical wall of the drum which has a transverse arc of not more than a quarter of a circle. To guide the cable into the groove 14 an inclined surface 19 is provided which I call a switch. All the switches 19 are located on the cross-over insert 13 which extends from one side of the drum to the other. This groove 14 is displaced from the last groove in the first layer by a distance equal to the radius of a strand of the cable. Therefore, the strand of the cable which follows the last strand in the bottom row will be guided into this groove 14 by the switch and be located at a distance from the last strand of the layer below equal substantially to the radius of the cable or of the groove 11 and also above it. This is the natural position of the cable to assume because the next strand in the second layer is located between two strands in the first layer. Therefore, the first strand in the second layer is located just where it would be if the two layers extended further along to the right in Fig. 1. Of course, where I mention the radius of the cable enough space is allowed for clearance as clearly appears in the drawing.

The second layer of cables will then pass to the left, being guided by the first layer, in the troughs of which it lies. In the second layer there are two more cables than there are in the first layer. The last one is received in a groove 15 which is spaced from the location of the next to the last strand in this layer a full space, or the full diameter of the cable, plus a half diameter and clearance. This provides a groove in which the cable necessarily seats itself.

From the second layer, the cable rises along a second switch 19 and enters a groove 16 which is like the groove 14, that is, displaced a distance equal to the radius of the cable. It then goes back and the last strand of this layer is located in a groove 17, and like the groove 15 is spaced a diameter and and a half. This procedure follows throughout the winding, and it will be noticed that each layer of strands contains two more strands than the one below, and at each end of the cables are held in the grooves alternatingly spaced a diameter and a half from the strands of the layer below. These features are repeated over and over.

In this way the drum can be wound with any desired number of layers of cables and, for a given length of cable, the drum can be made of much less width than would be the case if the cable could not be wound in a large number of layers. In this way, economy is provided in the manufacture of the drum, and the cables are not injured in winding or unwinding, because there is no tendency to crowd them against any straight sides. The cable is not squeezed in between two surfaces at any point, but lies naturally in a groove provided for it, and it receives no more wear at the ends than it does anywhere in the strands between the ends of the layer.

It will be noticed that there are shallow grooves 18 for giving a little extra room for the next to the last strand in every layer, but this occurs only on one end of each layer and these ends alternate.

The invention is shown in Fig. 2 as being carried out in a simpler and more regular way, which embodies the same principle. In this case an odd number of strands are shown in the first layer at the bottom and instead of increasing by two strands in each layer, the increase is by one strand only. In this case, grooves 20 are provided on both conical ends, each one displaced from the one below by a distance equal to the radius of the cable or groove plus clearance. The results are substantially the same, only there is not, in each layer at one end, a complete groove for supporting the entire cable, as is the case in Fig. 1, but there is always a half groove, so to speak, the same as the grooves 14 and 16 shown in Fig. 1. In this case the cables have to be located in a greater number of layers to get the same number of cables on a drum, but the width of the drum can be reduced still more if it is permissible to wind the cable in a larger number of layers.

Although I have illustrated and described only two forms of the invention, I am aware of the fact that modifications can be made therein by any person skilled in the art without departing from the scope of the invention as expressed in the claims. Therefore, I do not wish to be limited to the exact forms shown, but what I do claim is:—

1. As an article of manufacture, a winding drum having grooves formed at the center thereof for the first layer of strands of the cable, and end walls of a general conical shape having grooves formed therein for receiving the end strands of the successive layers thereon, so that in each layer there are more strands than in the layer below.

2. As an article of manufacture, a winding drum for cables having grooves formed in the circumferential wall thereof for the first row of strands of cable, and a groove in the wall of the drum for the next layer of strands, adjacent to the last one of said grooves, displaced longitudinally from the center of the last of said grooves by a distance slightly greater than the radius of the cable, for the purpose described.

3. As an article of manufacture, a winding drum having a face formed in the general shape of a cylinder at the bottom and two cones intersecting the same constituting the ends, the cylindrical surface being formed with a series of grooves around the drum, each adapted to receive a strand of the cable, the conical surfaces being formed of two classes of grooves for the different layers and involving a groove for each alternate layer displaced from the end groove below by a distance equivalent to the radius of the cable, and a semi-circular groove at the other end displaced from the groove below by a distance equivalent to a diameter and a half of the cable and alternating along the conical surface, whereby in each layer the drum is adapted to receive two more strands than in the layer below.

4. As an article of manufacture, a winding drum having its face formed in a cylindrical portion at the center and two conical portions at the ends intersecting the cylindrical portion, said cylindrical portion being provided with a series of grooves for receiving the cable, and the conical portion on each end being made up of a series of grooves, each of substantially a quarter circle, and each displaced from the end groove in the course below by a distance equal to half the diameter of the cable, whereby each layer of strands on the drum will contain one more than the layer below.

5. As an article of manufacture, a winding drum having grooves for receiving the first layer of the cable strands, said grooves being arranged straight and perpendicular to the axis of the drum and an insert extending around part of the drum having curved grooves for directing the cables from one of said straight grooves to the next one.

6. As an article of manufacture, a winding drum having grooves for receiving the first layer of the cable strands, said grooves being arranged straight and perpendicular to the axis of the drum and an insert extending around part of the drum having curved grooves for directing the cables from one of said straight grooves to the next one, said insert extending all the way across the drum having switches in the form of integral grooved projections on the side walls thereof for directing the cables from one layer to the next.

7. As an article of manufacture, a winding drum having grooves formed at the center thereof for the first layer of strands of the cable, and end walls of a general conical shape having grooves formed therein for receiving the end strands of the successive layers thereon, so that in each layer there are more strands than in the layer below, both sets of straight grooves being arranged at right angles to the axis of the drums, and an insert having grooving for directing the cable from one straight groove to the next.

8. As an article of manufacture, a winding drum for cables having grooves formed in the circumferential wall thereof for the first row of strands of cable, a groove in the wall of the drum adjacent to the last strand of the first layer displaced longitudinally and radially from the center of the last of the first named grooves, and a groove formed in the face of the drum at the other end at the same distance from the center as the second mentioned groove displaced from the first one of the first named grooves by a distance equal to the diameter of the cable plus clearance.

In testimony whereof I have hereunto affixed my signature.

H. LEONARD RICHARDSON.